United States Patent [19]
Raftis

[11] Patent Number: 5,215,123
[45] Date of Patent: Jun. 1, 1993

[54] PRESSURE RELIEF VALVE

[75] Inventor: Spiros G. Raftis, Pittsburgh, Pa.

[73] Assignee: Red Valve Company, Inc., Carnegie, Pa.

[21] Appl. No.: 849,986

[22] Filed: Mar. 12, 1992

[51] Int. Cl.5 .............................................. F16K 15/16
[52] U.S. Cl. ................................... 137/847; 137/513.5
[58] Field of Search .............................. 137/513.5, 847

[56] References Cited

U.S. PATENT DOCUMENTS

| | | | |
|---|---|---|---|
| 2,446,571 | 8/1948 | Browne | 137/847 |
| 4,585,031 | 4/1986 | Raftis | 137/847 X |
| 4,607,663 | 8/1986 | Raftis | 137/847 X |

Primary Examiner—Robert G. Nilson
Attorney, Agent, or Firm—Kirschstein, Ottinger, Israel & Schiffmiller

[57] ABSTRACT

A pressure relief valve has coil springs embedded within valve lips for constantly urging the lips closed. The internal springs resist environmental corrosion, and eliminate multi-part complex valve actuators.

15 Claims, 4 Drawing Sheets

PRESSURE RELIEF VALVE

BACKGROUND OF THE INVENTION

1. Field of the Invention

This invention generally relates to a pressure relief valve and, more particularly, to a normally-closed valve which opens when a pressurized fluid exceeding a threshold pressure flows therethrough.

2. Description of Related Art

Pressure relief valves are known for venting surge pressures in a pipeline, or for maintaining pipeline pressure. A typical relief valve employs a rubber sleeve and an externally-mounted actuator for pinching the sleeve closed. The actuator includes a spring loaded into a cylinder extending normally to the sleeve, as well as a tension-adjusting mechanism for the spring. When the pressure of a fluid flowing through the valve exceeds the spring tension, the sleeve opens.

Although generally satisfactory for its intended purpose, the external actuator for such a relief valve is a multi-part, complex arrangement subject to environmental corrosion and valve failure. The external actuator occupies space which, in some applications, may not be available. The external actuator contributes to an increased weight, size and cost, all factors which are better avoided.

SUMMARY OF THE INVENTION

1. Objects of the Invention

It is a general object of this invention to advance the state of the art of pressure relief valves.

It is another object of this invention to reduce the weight, size and cost of a conventional pressure relief valve.

Another object of this invention is to resist environmental corrosion and valve failure.

A further object of this invention is to eliminate valve-closing springs externally of a valve sleeve.

2. Features of the Invention

In keeping with these objects, and others which will become apparent hereinafter, one feature of this invention resides, briefly stated, in a valve, especially a pressure relief value for slurry service, as well as a method of making the valve. The valve includes a tubular, resilient body having an inlet portion, an outlet portion, and an internal flow-through passage extending along a longitudinal axis from the inlet to the outlet portions. The outlet portion has a pair of opposed valve lips movable toward and away from each other.

In accordance with this invention, biasing means are embedded within the valve lips. The biasing means, advantageously constituted as tensioned springs, are operative for constantly urging the lips toward each other with a biasing force. By embedding the springs within the lips, environmental corrosion and valve failure are avoided. The weight, size and cost of the valve are also minimized.

In a preferred embodiment, a pair of opposed resilient plates are also embedded in the lips. A first tube-shaped member or guide is connected to each plate. A clamping ring, advantageously comprised of two semicircular bands, is mounted around the lips. A second tube-shaped member or guide is connected to each band. Each of the first and second guides is mounted in telescoping relationship. Each spring is mounted between each of the first and second guides. One spring end bears against a respective plate, and the opposite spring end bears against a respective band. The tension in each spring is adjusted either by moving the bands toward and away from each other, or by directly compressing and expanding each spring.

Cellular inserts constituted of a sponge-like material are also embedded within the valve lips. Each insert surrounds a respective spring between a respective plate and a respective band. The inserts are radially compressible to facilitate movement of the valve lips.

The tensioned springs act against the bands to push the plates and the lips together to define a normally-closed condition for the valve. When a pressurized fluid, e.g. a slurry, flows along the passage, the pressurized slurry pushes the valve lips apart against the biasing force of the springs. Once the pressure of the slurry is less than the biasing force, the springs automatically act to bring the lips together.

In the preferred embodiment, the valve lips bound an elongated, linear mouth extending normal to the longitudinal axis. In a modification, a continuously open hole is formed along the longitudinal axis and extends through the mouth into the passage. This hole permits at least some fluid to always pass therethrough, i.e. without having to overcome the biasing force of the tensioned springs. There are some applications, for example, storm sewers, where the valve must permit complete sewage drainage at all times, even when the pressure does not exceed the spring tension. This modification, for example, prevents collection of stagnant water and mosquito infestations.

In accordance with the method of making the valve of this invention, the tubular body is formed by overlapping or wrapping multiple strips of resilient material, e.g. rubber, with or without reinforced fabric, onto a mandrel. During the formation of this multi-ply body, the opposed plates are embedded within the lips.

Thereafter, a pair of co-linear, radial holes are formed in the lips. The springs are inserted into the holes until leading spring ends respectively engage the plates. Thereafter, trailing spring ends are engaged with a ring that surrounds the lips. The ring tightly surrounds the lips in order to tension the springs and, in turn, to constantly urge the lips toward each other. The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
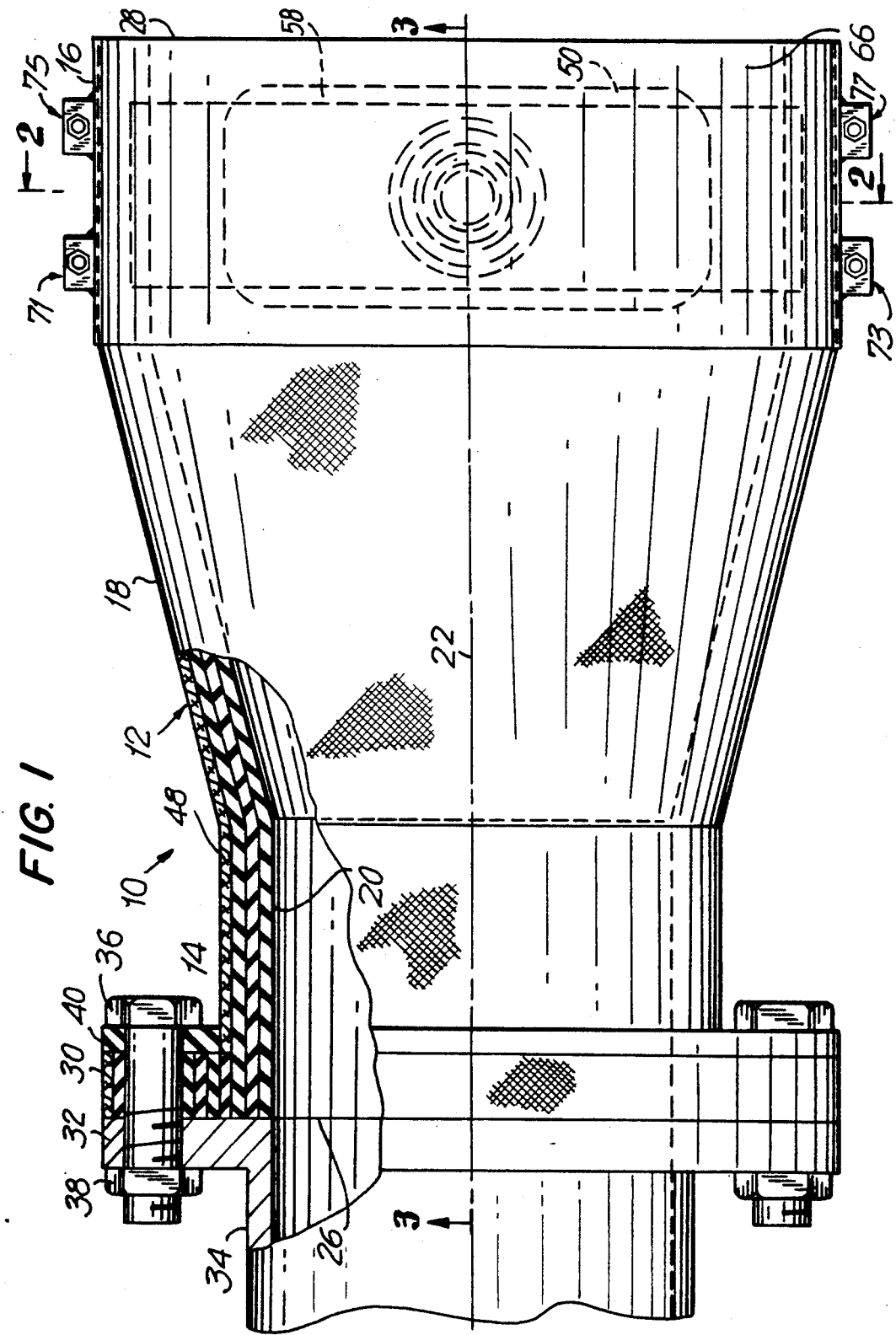
FIG. 1 is a partly broken-away, side, elevational view of a valve according to this invention as mounted on the end of a pipe.

Referring now to the drawings, reference numeral 10 generally identifies a pressure relief valve composed of a tubular resilient body or sleeve 12 having an inlet portion 14, an outlet portion 16, and an intermediate portion 18 between the inlet and outlet portions. Sleeve 12 has an interior flow-through passage 20 extending along a longitudinal axis 22 (FIG. 1) which lies in a horizontal longitudinal plane 24 and a vertical transverse plane 25 (see FIG. 2). The sleeve has opposite end faces 26, 28. The passage 20 extends interiorly through the valve portions 14, 18, 16 between the end faces 26,28.

Inlet portion 14 has a cylindrical side wall of constant thickness, as considered in both the vertical transverse plane 25 and the horizontal longitudinal plane 24. Inlet portion 14 has a circular flange 30 extending radially outwardly of its side wall. A plurality of mounting holes extend through the flange 30 and are equiangularly arranged about the longitudinal axis 22. In a typical installation, the flange 30 abuts against a circular pipe flange 32 at the end of a pipe 34. Pipe flange 32 has a corresponding plurality and arrangement of mounting holes for alignment with the mounting holes in flange 30. Threaded bolts 36 having heads at one side of the flange 30 extend through the aligned holes. Threaded nuts 38 positioned at the opposite side of the flange 32 threadedly engage the bolts 36. Tightening the nuts 38 causes the flanges 30, 32 to be brought into sealing surface engagement. A reinforcement sealing ring 40, also provided with a corresponding plurality and arrangement of mounting holes, is positioned between the flange 30 and the heads of the bolts 36, thereby completing the mounting of the valve sleeve 12 at the end of the pipe 34.

The passage 20 has a constant flow-through, circular, cross-section within and along the inlet portion 14 which matches a corresponding circular passage within pipe 34. A pressurized fluid, e.g. a liquid or a gas, with or without entrained solids, e.g. a slurry, flows through the pipe 34 into the passage 20 at the inlet portion 14 for movement downstream successively through the intermediate portion 18, the outlet portion 16,and past the end face 28.

Figure 3:
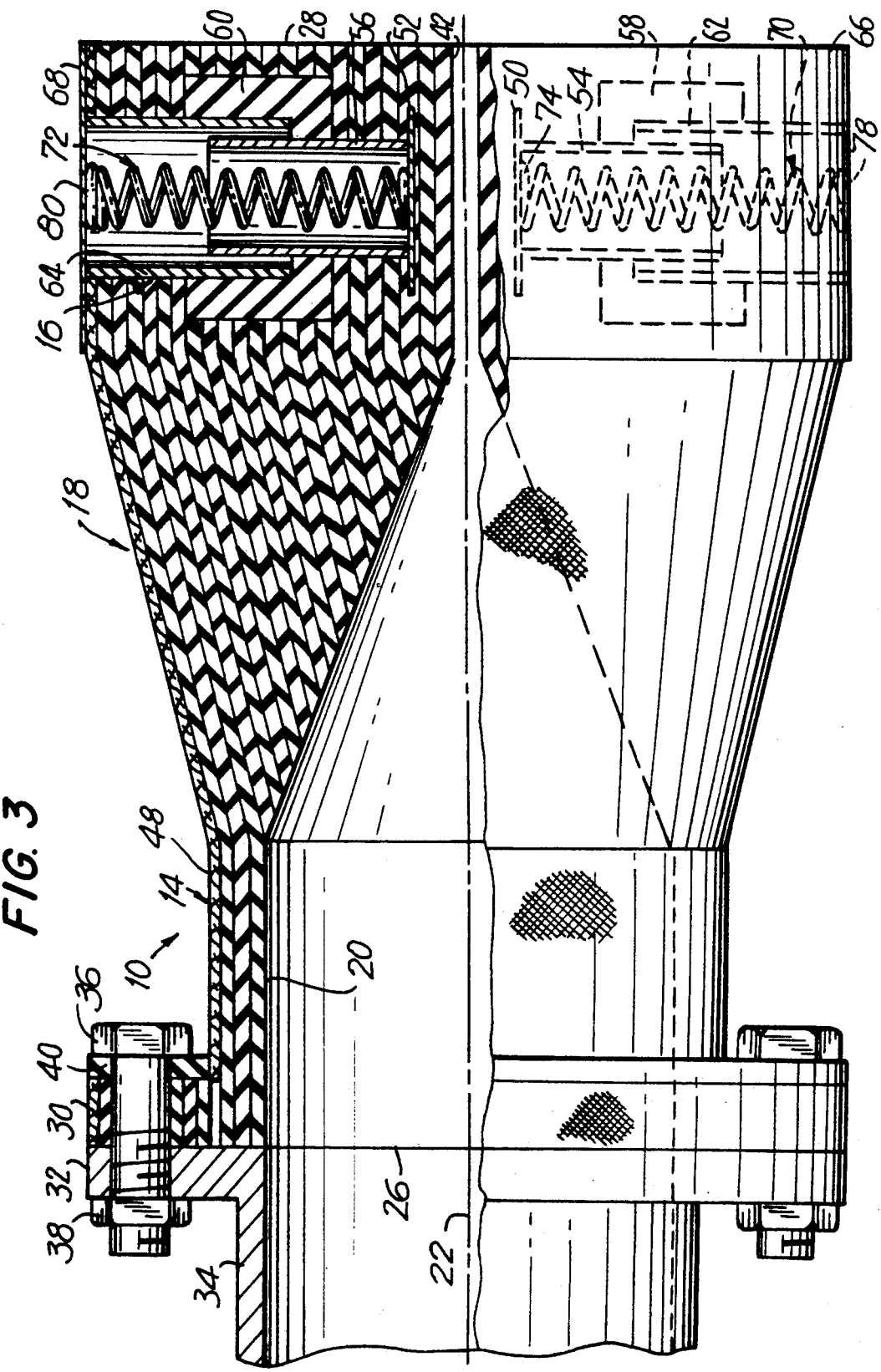
FIG. 3 is a plan, horizontal, sectional view taken on line 3—3 of FIG. 1.

The intermediate portion 18 has a side wall that diverges downstream in the vertical transverse plane (FIG. 1), and that also diverges downstream in the horizontal longitudinal plane (FIG. 3). The side wall of the intermediate portion 18 has substantially the same constant thickness as that of the side wall of the inlet portion in the vertical plane (FIG. 1), and has a variable thickness that increases downstream in the horizontal plane (FIG. 3). As best seen in FIG.3, the flow-through cross-section of the passage 20 within and along the intermediate portion 18 linearly decreases downstream, as considered in the horizontal plane, from a maximum (at inlet portion 14) to a minimum (at outlet portion 16). Simultaneously, as best seen in FIG. 1, the flow-through cross-section of the passage 20 within and along the intermediate portion 18 linearly increases downstream, as considered in the vertical plane, from a minimum (at inlet portion 14) to a maximum (at outlet portion 16).

The outlet portion 16 has a cylindrical side wall of substantially the same constant thickness as that of the respective side walls of the inlet portion 14 and the intermediate portion 18 in the vertical plane (FIG. 1).

The side wall of outlet portion 16 has a generally constant greater thickness dimension, as considered in the horizontal plane, which is approximately equal to the maximum thickness of the side wall of the intermediate portion 18. The flow-through cross-section of the passage 20 within and along the outlet portion 16 is constant and, as best seen in FIG. 2, is an elongated opening or mouth 42 extending linearly along the vertical plane 25.

The portions of the side wall of the outlet portion 16 at opposite sides of the mouth 42 are hereinafter referred to as lips 44, 46 movable toward and away from each other to respectively close and open the mouth 42. Although the mouth 42 is shown in FIGS. 1-3 as being slightly open, this was done for ease of illustration. Normally, the lips 44, 46, as explained below, are in mutual surface engagement so that the mouth 42 is fully closed.

The sleeve itself is advantageously constituted of layers or plies of resilient material. A three-dimensional mandrel having the shape of the passage 20 in both the horizontal and vertical planes is overlaid with strips of rubber-type material, e.g. pure gum rubber, neoprene, hypalon, chlorobutyl, polyurethane, buna-N, viton and EPDM. For increased reinforcement, any of the rubber-type materials may be reinforced with fabric. The resultant multi-ply laminated construction is eventually overwrapped with a fabric layer of webbing 48.

Figure 2:
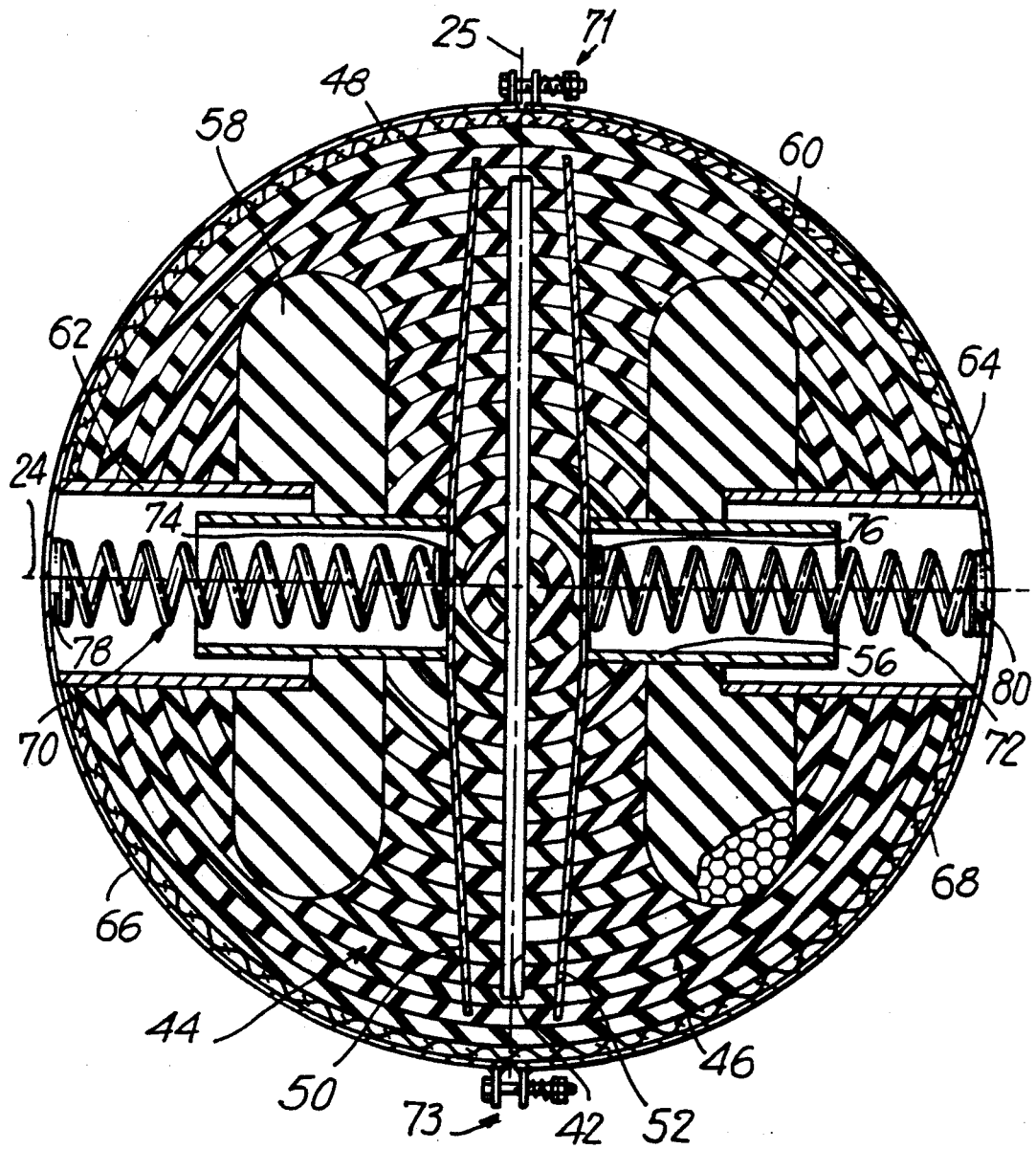
FIG. 2 is a transverse, vertical, sectional view taken on line 2—2 of FIG. 1.

As best shown in FIG. 2, a pair of opposed metal plates 50, 52,advantageously constituted as leaf springs, are embedded within the lips 44, 46 at opposite sides of the mouth 42. Tube-shaped members or first guides 54, 56 are welded to the plates 50, 52 in colinear relationship. The plates 50, 52,with their attached first guides 54, 56,are positioned during the strip-overlaying process.

Cellular inserts 58, 60 are also embedded within the lips 44, 46 at opposite sides of the mouth 42 and are spaced away from the plates 50, 52. Each insert has open or closed cells, preferably in a honeycomb pattern. Each insert bounds a respective first guide 54, 56. Each insert is positioned during the strip-overlaying process.

The assembly, as described so far, is then heated to elevated vulcanizing temperatures in a steam autoclave sufficient to cause the individual strips to fuse together in a vulcanization process. Once vulcanized, radial holes co-linear with the first tube guides 54, 56 are formed by drilling through opposite sides of the lips 44, 46 for reception of additional tube-shaped members or second guides 62, 64. The second guides 62, 64 are connected, e.g. by welding, to a pair of semi-circular bands 66, 68 which are mounted exteriorly of the fabric webbing 48 around the outlet portion 16.

Prior to placement of the bands 66, 68 about the outlet portion, a pair of elongated main coil springs 70, 72 are inserted through the drilled holes. The leading spring ends 74, 76 bear against the plates 50, 52. After placement of the bands 66, 68, trailing spring ends 78, 80 bear against the bands 66, 68.

Tensioning of the main springs 70. 72 is achieved by moving the bands 66, 68 together in a constricting manner onto the outlet portion 16. A first pair of upper and lower adjustment mechanisms 71, 73 and a second pair of upper and lower adjustment mechanisms 75, 77 (see FIG. 1) are mounted on the bands. Mechanisms 71 and 75 are co-linear. Mechanisms 73 and 77 are co-linear. The first and second pairs of mechanisms are spaced longitudinally apart.

Figure 4:
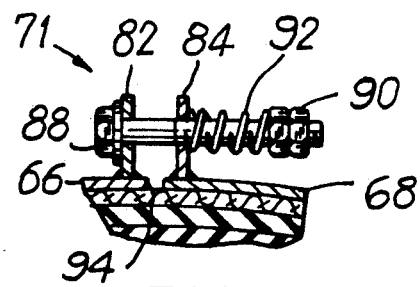
FIG. 4 is an enlarged, side, elevational view of one embodiment of a spring-tension-adjusting mechanism used on the valve of FIG. 1.

As best shown in FIG. 4, for representative mechanism 71, each adjustment mechanism has a first up-right flange 82 on band 66, and a second upright flange 84 on band 68. Flanges 82 and 84 are mutually parallel and have aligned holes through which a bolt 86 passes. Bolt 86 has a head 88 at one end for engaging the flange 82. A nut 90 at the other end of the bolt 86 is spaced away from the flange 84. A coil spring 92 surrounds the bolt and is clamped between the nut 90 and the flange 84. By turning the bolt 86 relative to the nut 90, the spring 92 is compressed or allowed to expand, as required.

Hence, by turning the bolts from each of the adjusting mechanisms, the bands 66, 68 are moved toward and away from each other in a contricting manner onto the outlet portion 16. A gap 94 (see FIG. 4) between the bands 66, 68 is made larger or smaller, depending on the direction of turning of the bolts.

Figure 5:
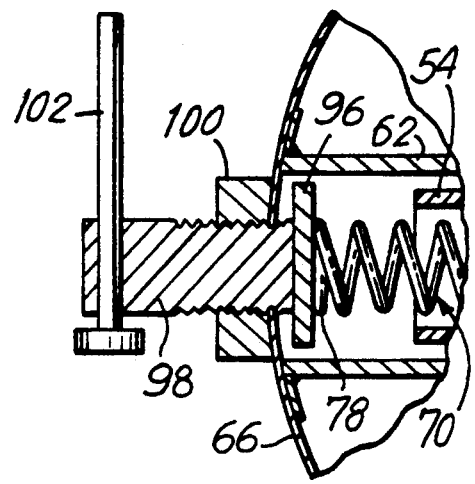
FIG. 5 is an enlarged, part-sectional view of another embodiment of a spring-tension-adjusting member.

Rather than tensioning the springs 70, 72 by moving the bands, it is also possible to change the effective length of each main spring 70, 72. As shown in FIG. 5 for representative main spring 70, the trailing spring end 78 bears against a plate 96 which is connected to a threaded positioning member 98. A complementary threaded positioning member 100 is mounted on the band 66. By turning the positioning member 98, preferably with the aid of a cross handle 102, the positioning member 98 threads into or out of the positioning member 100, thereby moving the plate 96 and, in turn, compressing the main spring 70 or allowing the latter to expand.

The tensioned main springs 70, 72 constantly push against the plates 50, 52 with a predetermined biasing force, thereby urging the lips 44, 46 tightly closed. Only when a pressurized fluid having a pressure exceeding said biasing force flows through the passage 20 will the lips 44, 46 be spread apart to allow the pressurized fluid to pass. Tension on the main springs 70, 72 is adjusted by operating the adjusting mechanisms. Depending on the size of the valve and the required application, springs of different spring constants can be embedded within the valve lips. The cellular inserts 58, 60 are compressed or allowed to expand during the opening and closing of the valve and permit ready movement of the valve lips apart and toward each other.

Figure 6:
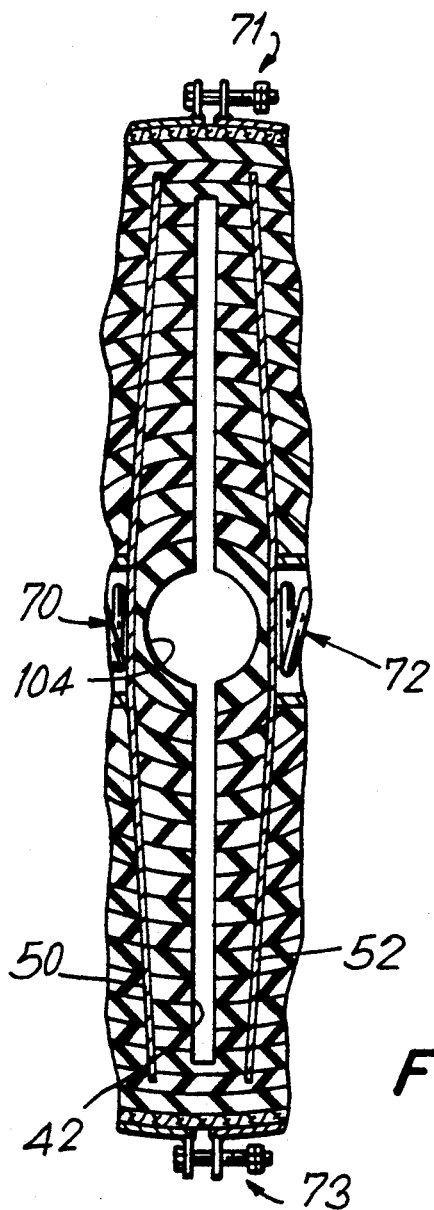
FIG. 6 is a broken-away, end view analogous to FIG. 2, but of a different valve.

In a modified valve, as shown in FIG. 6, the mouth 42 is provided with a constantly open hole 104 which extends through the mouth within and along the outlet portion 16 into the passage 20. This constantly-open hole 104 permits complete drainage of any fluid within the passage 20, even when the pressure of the fluid is insufficient to spread the valve lips 44, 46 apart.

It will be understood that each of the elements described above, or two or more together, also may find a useful application in other types of constructions differing from the types described above.

While the invention has been illustrated and described as embodied in a pressure relief valve, it is not intended to be limited to the details shown, since various modifications and structural changes may be made without departing in any way from the spirit of the present invention.

Without further anlysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A valve, comprising:
    a tubular, resilient body having an inlet portion, an outlet portion, and an internal flow-through passage extending along a longitudinal axis from the inlet portion to the outlet portion, said outlet portion having a pair of opposed valve lips movable toward and away from each other;
    a pair of opposed plates respectively embedded in the lips;
    a clamping ring surrounding the outlet portion and the plates;
    biasing means including a pair of elongated, tensioned springs embedded within the valve lips for constantly urging the lips toward each other with a biasing force, each spring having one spring end bearing against a respective plate and an opposite spring end bearing against the ring.

2. The valve according to claim 1, wherein the springs are coil springs and are co-linearly mounted relative to each other at the outlet portion.

3. The valve according to claim 2; and further comprising a pair of telescopingly received guides embedded in each lip, each pair of guides receiving a respective spring therein.

4. The valve according to claim 3, wherein one of the guides of each pair of guides is connected to a respective plate, and wherein another of the guides of each pair of guides is connected to the ring.

5. The valve according to claim 4; and further comprising a cellular insert embedded in each lip and surrounding each pair of guides between a respective plate and the ring.

6. The valve according to claim 1, wherein the plates are constituted of a resilient metallic material and are generally arranged in mutual parallelism.

7. The valve according to claim 1, wherein the lips bound an elongated mouth extending generally normal to the longitudinal axis and wherein the biasing means constantly urges the lips to a closed-mouth condition.

8. The valve according to claim 1, wherein the lips bound an elongated mouth extending generally normal to the longitudinal axis, and further comprising a constantly-open hole extending along the longitudinal axis through the mouth into the passage.

9. The valve according to claim 1, wherein the body is constituted of rubber reinforced with multiple fabric plies.

10. A valve, comprising:
    a tubular, resilient body having an inlet portion, an outlet portion, and an internal flow-through passage extending along a longitudinal axis form the inlet portion to the outlet portion, said outlet portion having a pair of opposed valve lips movable toward and away from each other;
    biasing means embedded within the valve lips for constantly urging the lips toward each other with a biasing force; and
    means for adjusting the biasing force.

11. The valve according to claim 10; and further comprising a pair of opposed plates respectively embedded in the lips, and a clamping ring surrounding the outlet portion and the plates; and wherein the biasing means includes a pair of elongated, tensioned springs, each having one spring end bearing against a respective plate, and an opposite spring end.

12. The valve according to claim 11, wherein the clamping ring has a longitudinal gap, and wherein the adjusting means includes a pair of threaded fasteners mounted on the ring and threadedly engaging each other to vary the gap.

13. The valve according to claim 11, wherein the clamping ring includes two semi-circular bands having two longitudinal gaps, and wherein the adjusting means includes two pairs of threaded fasteners, each pair mounted on a respective band and threadedly engaging each other to vary a respective gap.

14. The valve according to claim 13, wherein the adjusting means includes two additional pairs of threaded fasteners spaced longitudinally from the first-mentioned two pairs of threaded fasteners.

15. The valve according to claim 11, wherein the adjusting means includes a pair of positioning members, each connected to the opposite spring end of a respective spring, and a pair of threaded fasteners threadedly engaging each other, one threaded fastener being mounted on the ring, the other threaded fastener being connected to a respective positioning member; and further comprising a handle for turning said other threaded fastener to position the respective positioning member.

* * * * *